United States Patent [19]

Jenkins

[11] Patent Number: 4,946,932
[45] Date of Patent: Aug. 7, 1990

[54] WATER-DISPERSIBLE POLYESTER BLENDS

[75] Inventor: Waylon L. Jenkins, Kingsport, Tenn.

[73] Assignee: Eastman Kodak Company, Rochester, N.Y.

[21] Appl. No.: 279,673

[22] Filed: Dec. 5, 1988

[51] Int. Cl.$^5$ .............................................. C08G 63/02
[52] U.S. Cl. .................................. 528/272; 528/275; 528/288; 528/294; 528/295; 528/302; 528/304; 528/305; 528/308; 528/332; 525/39; 525/437; 524/36; 524/38; 524/39; 524/40; 524/41; 524/608; 428/288; 428/423.1; 428/458
[58] Field of Search ............... 528/272, 275, 288, 294, 528/295, 302, 304, 305, 308, 332; 524/38, 36, 39, 40, 41, 608; 428/288, 423.1, 458; 525/39, 437

[56] References Cited

U.S. PATENT DOCUMENTS

| | | | |
|---|---|---|---|
| 3,708,388 | 1/1973 | Lindemann et al. | 161/247 |
| 3,734,874 | 5/1973 | Kibler et al. | 524/603 |
| 3,779,993 | 12/1973 | Kibler | 528/295 |
| 4,119,680 | 10/1978 | Vachon | 525/30 |
| 4,335,220 | 6/1982 | Coney | 523/414 |

OTHER PUBLICATIONS

Paper presented by F. Cuirassier, Ch. H. Baradji and G. Riess, Preparation of Microlatex in the Presence of Functionalized Polyesters as Surfactants, at the Aug. 1987 National ACS Meeting.

*Primary Examiner*—John Kight
*Assistant Examiner*—S. A. Acquah
*Attorney, Agent, or Firm*—John F. Stevens; William P. Heath, Jr.

[57] ABSTRACT

A method of preparing water-dispersed polymer blends, comprising the steps of:
(i) preparing an aqueous polymerization mixture by adding to water, a sulfonate group-containing polyester or polyesteramide, one or more $\alpha,\beta$-unsaturated monomers and a polymerization initiator; and
(ii) polymerizing said polymerization mixture to provide said water-dispersed polymer blend.

Also disclosed is an aqueous dispersion of a polymer blend, comprising an aqueous dispersion having a solids content of about 30% to 65% of a polyester or polyesteramide blend comprising a sulfonate group-containing polyester or polyesteramide and a polymer comprising repeat units from one or more $\alpha,\beta$-unsaturated monomers.

17 Claims, No Drawings

WATER-DISPERSIBLE POLYESTER BLENDS

BACKGROUND OF THE INVENTION

1. Field of the Invention

The present invention relates to water-dispersible polyester blends. More specifically, the invention relates to blends of polymers of α,β-unsaturated monomers polymerized in the presence of sulfonate-containing polymers such that intimate blends of the polymers are achieved.

2. Discussion of the Background

There is a continuing interest in novel polymer blends or polyblends which are mixtures of structurally different homopolymers, copolymers, terpolymers and the like. Polyblends may be prepared from a wide variety of copolymers and terpolymers including random, alternating, graft and block copolymers, and terpolymers. Polyblend properties are generally a combination of the properties of the known polymer components of the polyblend and thereby exhibit new and useful polymer properties.

Polyester polyblends are known and are generally prepared by melt blending. However, intimate blends of water-dispersible polyesters are generally difficult to prepare because of the high melt viscosities of the polyesters involved and the incompatibility of most polyester polymers with other polymers. Additionally, intimate polyblends are very difficult to disperse in water if either of the polymers is not water dispersible or water soluble.

Blends can also be prepared in solution followed by removal of solvent, but this approach also has inherent problems. A mutual solvent or solvent mixture must be found that maintains compatibility as the polymer concentration increases during solvent removal. Frequently, two polymers are compatible at low concentrations in a solvent, but phase separation will occur as the solvent is removed. Furthermore, solvent removal is a difficult and expensive process, and even small amounts of solvent will create problems during further thermal processing of the polymer blend.

The formation of one polymer in the presence of another polymer is a known concept. For example, "core/shell" polymer systems are known in which a crosslinked "core" is first polymerized by emulsion polymerization, followed by addition of a second monomer which is polymerized to form a "shell."

Nonionic water-soluble polymers including poly(vinyl alcohol), hydroxylethylcellulose, gum acacia, polyacrylic acid, and various other water-soluble polymers have been used a protective colloids for polymerization of various monomers. The use of poly(vinyl alcohol) for vinyl acetate polymers has been particularly important commercially. For example, see U.S. Pat. No. 3,708,388.

U.S. Pat. No. 4,335,220 describes the use of water-dispersible polyesters as sequestering agents for water-immiscible solids and liquids. The material to be dispersed must be a hydrophobic deformable organic substance.

U.S. Pat. No. 4,119,680 describes grafted water-dispersible copolyesters useful as binders and finishes for polyester containing fabrics. The polyesters contain α,β-unsaturated dicarboxylic acids to provide sites for grafting. The graft copolymers are prepared by polymerization of vinyl or acrylic monomers in aqueous dispersions of these polyesters.

Water-soluble unsaturated polyester salts have been used to emulsify styrene to make polymers (Y. Ch. Chu and W. Funke, Angew. Makromol, Chem., 1982, No. 103, p. 187, 203; W. Funke et al., Makromol. Chem., 180, 1979, p. 2797; M. Narkis, J. Appl. Polym. Sci., 23, 1979, p. 2043; H. Baumann, B. Joos and W. Funke, Macromol. Chem. Phys., 1986, Vol. 187, p. 2933). This work concerns polyesters which are carboxyl terminated. The emulsifying properties are only observed if the carboxyl groups are completely dissociated, which requires a weakly alkaline environment (PH ca. 8.5). Work has been done with both saturated and unsaturated polyesters. These are low molecular weight polyesters with number average molecular weights reported from 1,000 to 3,000. At very short chain lengths the polyesters do not emulsify at all, and at higher molecular weights the polyesters are water insoluble even when the carboxyl groups are neutralized.

At the August 1987 national ACS meeting, a paper was presented by F. Cuirassier, Ch. H. Baradji and G. Riess on the preparation of microlatices in the presence of functionalized polyesters. The polyesters used were carboxy-terminated with number average molecular weights in the range of 1,000 to 4,000. Styrene and acrylic monomers were polymerized to form microemulsions. These polyesters appear to be similar to those used by Funke and are believed to have similar limitations.

Water-dispersible polyesters have found many applications in textile and printing applications. Water-dispersible polyesters have been used, for example, as textile sizes, particularly for polyester fibers, and have been used to develop aqueous inks. One characteristic of these water-dispersible polyesters is that the viscosity increases dramatically above about a 30% total solids content. As a consequence, these polyesters are typically used at solids content levels of 30% or less. Higher solids levels would be expected to offer several practical advantages including faster drying times and lower shipping and storage costs.

There exists a need for novel water-dispersible polyester blends and for an effective and practical way to prepare these polymer blends. There is also a need for a method of preparing aqueous dispersions of these polymer blends at total solids levels above 30% and preferably in the range of about 45% to 65% total solids. Finally, there is a need for a method of preparing water-dispersible polyester or polyesteramide blends which allows one to vary the properties of the polymer blend over a wide range of properties for each water-dispersible polyester or polyesteramide composition.

SUMMARY OF THE INVENTION

Accordingly, one object of the present invention is to provide a method of preparing water-dispersible polymer blends which enables one to prepare a variety of blends based on a given water-dispersible polyester composition, wherein the blends have a wide range of properties. The preferred method should also be useful for the preparation of crosslinked and curable compositions.

Another object of the invention is to provide water-dispersible polyester blends with solids levels above about 30% and preferably up to about 45% to 65% total solids.

These and other objects which will become apparent from the following specification have been achieved by the present method of preparing a water-dispersed polymer blend comprising the steps of:
  (i) preparing an aqueous polymerization mixture by adding to water, a sulfonate group-containing polyester or polyesteramide, one or more α,β-unsaturated monomers and a polymerization initiator; and
  (ii) polymerizing the monomer in the aqueous dispersion of the polyester or polyesteramide to provide a water-dispersed polymer blend;

Also, it is an object of the present invention provide aqueous dispersions prepared by the above process, the aqueous dispersions having a solids content of about 30% to 65% of an intimate polymer blend, the solids comprising about 1 to 95 weight % of a sulfonate group-containing polyester or polyesteramide and about 99 to 5 weight % of a polymer comprising repeating units from one or more α,β-unsaturated monomers.

DETAILED DESCRIPTION OF THE PREFERRED EMBODIMENTS

The novel polyester blends of the present invention are prepared by polymerizing α,β-unsaturated monomers in an aqueous dispersion of a sulfonate group-containing polyester or polyesteramide and a polymerization initiator to obtain an intimate blend of the polymers. Aqueous dispersions of these polymer blends exhibit useful properties which are distinctly different from those of the polyesters or polyesteramides themselves. For example, the inherent viscosities, flexibility, and elongation of the blends of the present invention are significantly different than those of the sulfonate group-containing polyesters or polyesteramides. Aqueous dispersions of the polymer blends of the present invention are useful in inks, adhesives and other coatings.

These polyesters and polyesteramides typically have an inherent viscosity of about 0.2 to 0.5 and many have been described in U.S. Pat. Nos. 3,734,874, 3,779,993, and 4,335,220. The disclosures of these U.S. patents are incorporated herein by reference to provide a more complete description of the sulfonate group-containing polymers which may be used in the present invention. Basically, these polyesters and polyesteramides are described as having carbonyloxy interconnecting groups in the linear molecular structure wherein up to 80% thereof may be carbonylamido linking groups, the polymer having an inherent viscosity of at least about 0.1, and the polymer consisting essentially of the following components or ester forming or ester-amide forming derivatives thereof;
  (a) at least one difunctional dicarboxylic acid;
  (b) from about 4 to about 25 mole percent, based on a total of all acid, hydroxyl and amino equivalents being equal to 200 mole percent, of at least one difunctional sulfomonomer containing at least one metal sulfonate group attached to an aromatic nucleus wherein the functional groups are hydroxy, carboxyl or amino; and
  (c) at least one glycol or a mixture of a glycol and a diamine having two -NRH groups, the glycol containing two -CH$_2$-OH groups.

Dispersibility is related to the weight percent of poly(ethylene glycol and mole percent of sulfomonomer. Therefore, if the content of either is relatively low, the other should be relatively high to maintain dispersibility.

The polymer may contain at least one difunctional reactant selected from a hydroxycarboxylic acid having one -CH$_2$-OH, an aminocarboxylic acid having one -NRH group, an aminoalcohol having one -CR$_2$-OH group and one -NRH or mixtures thereof, wherein each R is an H atom or an alkyl group of 1 to 4 carbon atoms.

The dicarboxylic acid component of the polyester or polyesteramide comprises aliphatic dicarboxylic acids, alicyclic dicarboxylic acids, aromatic dicarboxylic acids, or mixtures of two or more of these acids. Examples of such dicarboxylic acids include succinic; glutaric; adipic; azelaic; sebacic; itaconic; 1,4-cyclohexanedicarboxylic; phthalic; terephthalic and isophthalic. If terephthalic acid is used as the carboxylic acid component of the polyester, superior results are achieved when at least 5 mole percent of one of the other acids is also used.

It should be understood that use of the corresponding acid anhydrides, esters, and acid chlorides of these acids is included in the term "dicarboxylic acid."

Other suitable acids are disclosed in U.S. Pat. No. 3,779,993.

The difunctional sulfo-monomer component of the polyester or polyesteramide may advantageously be a dicarboxylic acid or an ester thereof containing a metal sulfonate group or a glycol containing a metal sulfonate group or a hydroxy acid containing metal sulfonate group. The metal ion of the sulfonate salt may be Na$^+$, Li$^+$, K$^+$ and the like. When a monovalent alkali metal ion is used, the resulting polyesters or polyesteramides are less readily dissipated by cold water and more readily dissipated by hot water. When a divalent or a trivalent metal ion is used, the resulting polyesters or polyesteramides are not ordinarily easily dissipated by cold water but are more readily dissipated in hot water. It is possible to prepare the polyester or polyesteramide using, for example, as sodium sulfonate salt and later by ion-exchange replace this ion with a different ion, and thus alter the characteristics of the polymer. The difunctional monomer component may also be referred to as a difunctional sulfomonomer and is further described hereinbelow.

Advantageous difunctional sulfo monomer components are those wherein the sulfonate salt group is attached to an aromatic acid nucleus such as benzene, naphthalene, diphenyl, oxydiphenyl, sulfonyldiphenyl or methylenediphenyl nucleus. Preferred results are obtained through the use of sulfophthalic acid, sulfoterephthalic acid, sulfoisophthalic acid, 4-sulfonaphthalene-2,7-dicarboxylic acid, and their esters; metallosulfoaryl sulfonate as described in U.S. Pat. No. 3,779,993.

Particularly superior results are achieved when the difunctional sulfo-monomer components is 5-sodiosulfoisophthalic acid or its esters and the glycol is a mixture of ethylene glycol or 1,4-cyclohexanedimethanol with diethylene glycol.

When the sulfonate-containing difunctional monomer is an acid or its ester, the polyester or polyesteramide should contain at least 8 mole percent of said monomer based on total acid content, with more than 10 mole percent given particularly advantageous results. Total acid content is calculated as the sum of (1) moles of component (a) namely dicarboxylic acids, (2) one-half of the moles of carboxyl-containing compounds of component (d), (3) moles of component (c) which are dicarboxylic acids, and (4) one-half of the moles of component (c) which are monocarboxy-containing compounds.

In the preferred form of the present invention, at least part of the glycol component contains repeating units of a poly(ethylene glycol) of the formula $H-(OCH_2-CH_2)_n-OH$ wherein n is an integer of 2 to 500. The values of n and the mole percent of poly(ethylene glycol) in the polyester, if used, are adjusted such that the mole percent of poly(ethylene glycol) within the stated range is inversely proportional to the quantity of n within the stated ranges. Thus, when the mole percent is high, the value of n is low. On the other hand, if the mole percent is low, the value of n is high. It is apparent, therefore, that the weight percent (product of mole percent and molecular weight) of the poly(ethylene glycol) is an important consideration because the water dissipatability of the copolyester decreases as the weight percent poly(ethylene glycol) in the copolyester decreases. For example, if the weight percent of poly-(ethylene glycol) is too low, the water dissipatibility of the copolyester may be inadequate. Furthermore, the weight percent of poly(ethylene glycol) is preferably adjusted such that it is inversely proportional to the mole percent of the difunctional sulfomonomer because the water dissipatibility of the copolyester is a function of both the mole percent sulfomonomer and the weight percent polyethylene glycol.

Examples of suitable poly(ethylene glycols) include relatively high molecular weight polyethylene glycols, some of which are available commercially under the designation "Carbowax," a product of Union Carbide. Diethylene glycol is also especially suitable.

Other useful glycols for preparing copolyesters may consist of aliphatic, alicyclic, and aralkyl glycols. Examples of these glycols include ethylene glycol; propylene glycol; 1,3-propanediol; 2,4-dimethyl-2-ethylhexane-1,3-diol; 2,2-dimethyl-1,3-propanediol; 2-ethyl-2-butyl-1,3-propanediol; 2-ethyl-2-isobutyl-1,3-propanediol; 1,3-butanediol, 1,4-butanediol; 1,5-pentanediol; 1,6-hexanediol; 2,2,4-trimethyl-1,6-hexanediol; thiodiethanol; 1,2-cyclohexanedimethanol; 1,3-cyclohexanedimethanol; 1,4-cyclohexanedimethanol; 2,2,4,4-tetramethyl-1,3-cyclobutanediol; p-xylylenediol.

Useful polyesters include those wherein the sulfomonomer is a dicarboxylic acid and constitutes about 8 to 50 mole percent, preferably about 10 to about 50 mole percent based on the sum of (1) the moles of the total dicarboxylic acid content of components (a) and (b), and (2) one-half of the moles of any hydroxycarboxylic acid.

Other useful polyesters include those wherein the sulfomonomer is a glycol and constitutes about 8 mole percent to about 50 mole percent based on the sum of the total glycol content measured in moles of (b) and (c), and one-half of the moles of any hydroxycarboxylic acid.

The specific types of unsaturated monomers are chosen to provide a particular range of properties to the polyester blend. A variety of monomer species which vary gradually in chemical structure and therefore physical properties of the resulting polymer allows one to tailor the properties of the blend by employing selected species of the monomers or mixtures of monomers. Suitable monomers include both crosslinking and non-crosslinking monomer species.

Since the monomers are polymerized in an aqueous polymerization mixture, it is desirable that the monomers be insoluble in water or have limited water solubility. When the monomers have substantial water solubility, polymerization can occur in the aqueous medium away from the polyester polymer resulting in substantial amounts of polymer in aqueous solution, resulting in high viscosities which will limit the achievable solids. These polymers which are not associated with the polyester particles are not part of the present invention.

However, when the monomers have limited water solubility, i.e., they are attracted to the polyester, polymerization occurs in and around the polyester particles resulting in an intimate polymer blend. Accordingly, it is preferable that the monomers be insoluble in water or have limited water solubility.

One class of preferred monomers are acrylic and methacrylic esters. Acrylic and methacrylic acid esters having from 1 to about 20 carbon atoms in the alcohol moiety are commercially available or can be easily prepared by known esterification processes. Preferred esters are the methyl, ethyl, butyl, 2-ethylhexyl and lauryl esters.

The acrylic and methacrylic acid esters may contain additional functional groups on the alcohol moiety, such as for example, hydroxyl, amine, halogen, ester, carboxylic acid, amide, nitrile and alkyl groups. Functionalized monomers such as hydroxyethyl methacrylate, acetoacetoxyethyl methacrylate, and blocked isocyanate acrylates and methacrylates may also be used to provide crosslinking sites for the preparation of curable systems.

Other preferred classes of monomers include the vinyl esters of $C_{1-6}$ carboxylic acids, such as for example vinyl acetate, vinyl propionate and vinyl butanoate. Vinyl acetate is preferred due to its availability and low cost. Mixtures of these vinyl esters with olefin monomers, such as for example ethylene, also provide modified polyester dispersions having particularly useful properties. The relative amounts of vinyl ester and olefin monomers are varied to provide the desired properties in the blend, and generally range from about 5:95 to about 99:1, preferably 60:40 to 95:5, respectively, by weight.

Also useful as comonomers are lower alkyl diesters of unsaturated dicarboxylic acids. For example, the $C_{1-4}$ diesters of maleic and fumaric acids may be used in copolymers with vinyl acetate.

Other useful monomers include styrene and styrene derivatives such as $\alpha$-methylstyrene, ring-halogenated styrenes, etc., as well as acrylonitrile, acrylic acid, methacrylic acid, acetoacetoxyethyl methacrylate and the corresponding acrylate, and halogenated vinyl monomers such as vinyl chloride and vinylidene chloride. These monomers may be used individually or may be used as mixtures to provide the desired properties. The preferred ratios of the various monomers can be readily determined by one skilled in the art and are dependent upon the particular application and desired properties of the water-dispersible polyester blend.

The compositions of the present invention are prepared in aqueous dispersions. The monomers are generally added to an aqueous dispersion of the water-dispersible polyester and polymerized by free radical initiation in conventional emulsion or suspension polymerization processes. The preferred ratio of polyester to monomer will vary widely and depends on the intended application for the blend. The blend compositions of the present invention, on a weight basis of solids, contain about 1% to 95% polyester or polyesteramide (preferably about 5% to 75%) and about 99% to 5% monomer (preferably about 95% to 25%).

The modified polyester dispersions of the present invention are believed to have a "core/shell" morphology. However, in contrast to acrylic core/shell polymers, the core is formed in the shell, rather than the shell being formed around the core. The water-dispersed blends of the present invention are therefore distinguishable from the graft copolymers disclosed in U.S. Pat. No. 4,119,680 in which the polyesters contain $\alpha,\beta$-unsaturated dicarboxylic acids as a means of providing grafting sites.

The polymerization can be initiated by a water-soluble free radical initiator known in the art such as sodium persulfate or by an oil-soluble initiator such as AIBN or benzoyl peroxide. Other useful initiators include redox initiators such as sodium persulfate/sodium metabisulfite and sodium formaldehyde sulfoxylate/Fe/hydrogen peroxide.

The sulfonate-group containing polymers which are used in the present invention typically become very viscous at concentrations above about 30% total solids. Thus, the reaction typically is begun with a polyester or polyesteramide dispersion that is about 30% total solids or less. However, the dispersions are prepared at final total solids levels up to about 45% to 65%. A total solids content of about 40% to 55% is preferred. The increase in solids level is achieved during polymerization by controlling the amount of water, if any, which is added along with the monomer. By limiting the amount of water added during the polymerization, increased total solids contents up to about 50% to 65% are possible. This increase in the solids level offers significant benefits for the use of the water-dispersible polyesters of the present invention.

In a preferred embodiment, the sulfonate group-containing polymer is prepared, generally by melt polymerization, and an aqueous dispersion containing from about 10% to 30% total solids is prepared from the polyester or polyesteramide directly. A mixture of one or more monomers and the polymerization initiators may then be added to the aqueous dispersion of the polyester or polyesteramide and polymerization initiated to produce an aqueous dispersion. The aqueous dispersion so produced can be prepared with total solids contents from about 10% to about 65%. Preferably, the pH is, or is adjusted to be within the range of about 4–8 in order to minimize hydrolysis of the polyester.

The aqueous polyester blend dispersion prepared in this manner may be used directly as paper adhesives and other coatings. Viscosity control agents, colorants, dyes, stabilizers, etc., may be added to the aqueous dispersions to prepare specific adhesives, coatings, inks, etc.

The maximum useable total solids content of the aqueous dispersion is largely controlled by the relative amounts of monomers which are used in the polymerization reaction compared to the amount of polyester or polyesteramide. As noted above, aqueous dispersions of sulfonate group-containing polymers can practically be prepared only at total solids contents up to about 30%. Above 30%, these dispersions become highly viscous and difficult to process. Higher practical total solids contents can be obtained by increasing the amount of monomer and decreasing the amount of polyester or polyesteramide which are used in the polymerization reaction. For example, a ratio of polyester or polyesteramide/monomer of 50/50 can produce a good dispersion with a total solids content of about 40% to 45% when using vinyl acetate as the monomer. If the ratio of polyester or polyesteramide/monomer is changed to about 5/95, respectively, a total solids content of about 55% to 60% is obtainable. Accordingly, to obtain aqueous dispersions having higher total solids contents, the polymerization reaction should be conducted with lower polyester or polyesteramide/monomer ratios.

The polyester or polyesteramide/monomer ratio will depend on the particular application for which the dispersion is intended. For example, in adhesive applications, polyester or polyesteramide/monomer ratios ranging from about 1/20 to about ¼, more preferably 1/20 to 1/10 are desirable. On the other hand, for other applications, polyester or polyesteramide/monomer ratios ranging from about ¼ to about 3/5 may be preferred. The desired solids content of the aqueous dispersion will depend on the particular application and can be readily adjusted by one skilled in the art. The specific amounts of polyester or polyesteramide polymer and second polymer can be chosen by one skilled in the art depending on the specific monomers, the desired total solids content and the application for which the aqueous dispersion is intended. The dispersions are used by applying them as a coating to a substrate such as paper, plastic or metal followed by drying to leave a residue of solids in the form of a coating.

Other features of the invention will become apparent in the course of the following descriptions of exemplary embodiments which are given for illustration of the invention and are not intended to be limiting thereof.

EXAMPLES

Example 1

A mixture of 250 g of an aqueous 30% solids dispersion of a water-dispersible polyester, 75 g butyl acrylate, and 75 g of additional water is heated with stirring to 60° C. The polyester is prepared from 82 mol % diethylene glycol and 46 mol % cyclohexanedimethanol. The polyester has a Tg of 55° C. and an inherent viscosity (I.V.) of 0.33. Sodium persulfate (0.75 g) is added as an initiator. The temperature begins to rise and reaches 86° C. after about 10 minutes. Heating is continued for a total of 6 hours before cooling. A sample of the dispersion is dried to yield a white, flexible film. For comparison, a film of the polyester is clear and brittle, and a film of butyl acrylate is very soft and sticky.

Example 2

A mixture of 415 g of the 30% solids water-dispersible polyester dispersion described in Example 1, and 875 g water are heated to 60° C. with stirring. Sodium persulfate (1.875 g in 10 mL water) is then added. Butyl acrylate (375 g) is added over a period of about 3 hours. After polymerization is complete, a sample of the product is isolated by drying to yield a white, flexible film. Although a Tg of −40° C. is measured by dynamic mechanical analysis, the film is not tacky. The I.V. of the product is 1.57.

Example 3

A mixture of 833 g of the water-dispersible polyester dispersion described in Example 1, and 583 g water are heated to 60° C. with stirring. Sodium persulfate (1.25 g in 10 mL water) is then added. Butyl acrylate (250 g) is added over a period of about 2 hours, and after polymerization, a sample of the product is isolated by drying to yield a translucent, white, flexible film. Although Tg's of −40° and 55° C. are measured by dynamic mechanical analysis, the film is not tacky. The I.V. of the product is 0.84.

Example 4

A mixture of 1,250 g of the water-dispersible polyester dispersion described in Example 1, and 292 g water are heated to 60° C. with stirring. Sodium persulfate (0.625 g in 10 mL water) is then added. Butyl acrylate (125 g) is added over a period of about 1 hour. A sample of the product is then isolated by drying to yield a hazy, hard film. Although Tg's of −40° and 55° C. are measured by dynamic mechanical analysis, the film is not tacky. The I.V. of the product is 1.573.

Example 5

A 2 l reactor is charged with 667 g of a 30% solids polyester dispersion and 433 g water. The polyester is a product of the reaction of isophthalic acid (82 mol %), 5-(sodiosulfo)isophthalic acid (18 mol %), and diethylene glycol (100 mol %) and has a Tg of 29° C. and an I.V. of 0.43. The mixture is heated to 65° C. under a nitrogen blanket and 2.0 g sodium persulfate is then added. Vinyl acetate (400 g) is fed into the reactor over a period of about 3 hours. During the reaction the temperature increases to 68° C. and then returns to 65° C. The mixture is stirred with heating for 3 hours after addition is completed. The dispersion is white and low in viscosity. The flow time for 10 mL from a 10 mL pipet is 8.4 seconds compared to a flow time of 6.3 seconds for water from the same pipet. The pH is 4.55, and the % solids content is 39.3%. In contrast, a composition of the polyester at 40% solids with water is too viscous to draw into a pipet.

Inherent viscosity (I.V.) is measured at 25° C. using 0.50 g of polymer per 100 mL of a solvent consisting of 60% by weight phenol and 40% by weight tetrachloroethane.

Unless otherwise specified, all parts, percentages, ratios, etc., are by weight.

It should be understood that the term "water dispersible" is intended to include substances which are, to some extent, water soluble.

Obviously, numerous modifications and variations of the present invention are possible in light of the above teachings. It is, therefore, to be understood that within the scope of the appended claims, the invention may be practiced otherwise than as specifically described herein.

I claim:

1. A method of preparing water-dispersed polymer blends, comprising the steps of:
   (i) preparing an aqueous polymerization mixture by adding to water, a water-dispersible sulfonate group-containing polyester or polyesteramide, one or more α,β-unsaturated monomers and a polymerization initiator said polyester or polyesteramide consisting essentially of repeat units from
      (a) at least one difunctional aromatic, saturated aliphatic or saturated alicyclic dicarboxylic acid;
      (b) from about 4 to about 25 mole percent, based on a total of all acid, hydroxyl and amino equivalents being equal to 200 mole percent, of at least one difunctional sulfomonomer containing at least one metal sulfonate group attached to an aromatic nucleus wherein the functional groups are hydroxy, carboxyl or amino; and
      (c) at least one glycol or a mixture of a glycol and a diamine having two -NRH groups, the glycol containing two -CH$_2$-OH groups, and
   (ii) polymerizing said monomers to provide said water-dispersed polymer blend.

2. The method of claim 1, wherein said monomers include an acrylic or methacrylic acid ester.

3. The method of claim 2, wherein said ester is a $C_{1-20}$ acrylic or methacrylic acid ester.

4. The method of claim 1, wherein said monomers include a vinyl $C_{1-6}$ carboxylic acid ester.

5. The method of claim 4, wherein said ester is vinyl acetate.

6. The method of claim 5, wherein said monomer comprises a mixture of a vinyl ester and an olefin.

7. The method of claim 1, wherein one or more of said monomers is selected from the group consisting of styrene, acrylonitrile vinyl chloride, hydroxyethylmethacrylate, toacetoxyethylmethacrylate, and vinyl acetate.

8. The method of claim 1, wherein said polymerization initiator is selected from the group consisting of sodium persulfate, AIBN, benzoyl peroxide and sodium bisulfate/sodium metabisulfite.

9. The method of claim 1, wherein said sulfonate group containing polyester or polyesteramide has an inherent viscosity of 0.2 to 0.5.

10. The method of claim 1, wherein said blend contains about 1 to 95 weight % polyester or polyesteramide and about 99 to 5 weight % monomer, said weights being based on the total polymer and monomer weights.

11. The method of claim 1, wherein said polyester or polyesteramide is a polyester comprising repeat units from isophthalic acid, sodiosulfo-isophthalic acid, and diethylene glycol.

12. A composition of matter comprising: an aqueous dispersion having a total solids content of about 30% to 65% of a polymer blend, said blend comprising about 1 to 95 weight % of a sulfonate group-containing polyester or polyesteramide and about 99 to 5 weight % of a polymer comprising repeat units from one or more α,β-unsaturated monomers said polyester or polyesteramide consisting essentially of repeat units from
   (a) at least one difunctional aromatic, saturated aliphatic or saturated alicyclic dicarboxylic acid;
   (b) from about 4 to about 25 mole percent, based on a total of all acid, hydroxyl and amino equivalents being equal to 200 mole percent, of at least one difunctional sulfomonomer containing at least one metal sulfonate group attached to an aromatic nucleus wherein the functional groups are hydroxy, carboxyl or amino; and
   (c) at least one glycol or a mixture of a glycol and a diamine having two -NRH groups, the glycol containing two -CH$_2$-OH groups.

13. The dispersion of claim 12, wherein said monomers comprise monomers selected from the group consisting of acrylic and methacrylic acid esters, vinyl carboxylic acid esters, unsaturated dicarboxylic acid diesters, styrene, vinyl chloride and vinylidene chloride.

14. The dispersion of claim 12, wherein said monomers are selected from the group consisting of $C_{1-20}$ alkyl acrylate and methacrylate esters, vinyl esters of $C_{1-6}$ carboxylic acids, ethylene, styrene, α-methyl styrene, ethyl styrene, acrylonitrile, acrylic acid, methacrylic acid, acetoacetoethyl methacrylate, acetoacetoxyethyl acrylate, vinyl chloride and vinylidene chloride.

15. The dispersion of claim 12, comprising a total solids content of about 30% to 65%.

16. The dispersion of claim 12, comprising a total solids content of about 40% to 55%.

17. The dispersion of claim 12, wherein said polyester or polyesteramide is a polyester comprising repeat units from isophthalic acid, sodiosulfoisophthalic acid and diethylene glycol.

* * * * *